(12) United States Patent
Doisneau et al.

(10) Patent No.: US 10,543,624 B2
(45) Date of Patent: Jan. 28, 2020

(54) PROCESS FOR TREATING A REINFORCING ELEMENT HAVING A FLATTENED CROSS-SECTION

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: David Doisneau, Clermont-Ferrand (FR); Nicole Dajoux, Clermont-Ferrand (FR); Christophe Le Clerc, Clermont-Ferrand (FR); Thomas Guy, Clermont-Ferrand (FR)

(73) Assignee: Compagnie Generale Des Etablissements Michelin, Clermont-Ferrand (FR)

(*) Notice: Subject to any disclaimer, the term of this patent is extended or adjusted under 35 U.S.C. 154(b) by 507 days.

(21) Appl. No.: 15/039,499

(22) PCT Filed: Nov. 27, 2014

(86) PCT No.: PCT/EP2014/075747
§ 371 (c)(1),
(2) Date: May 26, 2016

(87) PCT Pub. No.: WO2015/078946
PCT Pub. Date: Jun. 4, 2015

(65) Prior Publication Data
US 2017/0001341 A1 Jan. 5, 2017

(30) Foreign Application Priority Data

Nov. 28, 2013 (FR) .................... 13 61728

(51) Int. Cl.
B29C 35/08 (2006.01)
B29K 33/04 (2006.01)
(Continued)

(52) U.S. Cl.
CPC ...... *B29C 35/0866* (2013.01); *B29K 2033/04* (2013.01); *B29K 2061/00* (2013.01); *B29K 2077/00* (2013.01); *B29L 2030/00* (2013.01)

(58) Field of Classification Search
CPC ..... B29C 35/0866; B29C 37/02; B29C 71/02; B29C 35/0266; B29C 59/14;
(Continued)

(56) References Cited

U.S. PATENT DOCUMENTS 3,853,657 A  12/1974  Lawton .................... 156/180
4,606,930 A  8/1986  Ueno et al. ................ 427/40
(Continued)

FOREIGN PATENT DOCUMENTS

DE  36 21 205 A1  1/1988
DE  36 36 395 A1  5/1988
(Continued)

*Primary Examiner* — Robert J Grun
(74) *Attorney, Agent, or Firm* — Venable LLP

(57) ABSTRACT

A reinforcing element, having a cross section with a flattened overall shape and extending in a main direction and comprising at least one lateral edge made of a polymeric composition comprising a thermoplastic polymer, the lateral edge extending in a general direction substantially parallel to the main direction is treated by heating at least a part of the lateral edge, during which at least a part of the lateral edge is subjected to a plasma flow so as to raise the temperature of the part of the lateral edge above the melting point of the thermoplastic polymer.

22 Claims, 7 Drawing Sheets

(51) Int. Cl.
  *B29K 61/00* (2006.01)
  *B29K 77/00* (2006.01)
  *B29L 30/00* (2006.01)

(58) Field of Classification Search
  CPC .......... B29C 2059/145; B29D 30/0005; B29D 2030/383; B29D 2030/0011; B29K 2033/04; B29K 2077/00; B29K 2061/00; B29L 2030/00
  See application file for complete search history.

(56) References Cited

U.S. PATENT DOCUMENTS

| | | | |
|---|---|---|---|
| 4,867,937 A | 9/1989 | Li et al. | 264/290.2 |
| 4,876,137 A | 10/1989 | Utsumi | 428/141 |
| 5,017,423 A | 5/1991 | Bossmann et al. | 428/224 |
| 5,053,246 A | 10/1991 | Shuttleworth et al. | 427/40 |
| 5,283,119 A | 2/1994 | Shuttleworth et al. | 428/375 |
| 5,409,657 A | 4/1995 | Gerwig et al. | 264/290.2 |
| 8,960,252 B2 | 2/2015 | Deal | 152/526 |
| 9,186,871 B2 | 11/2015 | LeClerc | 152/526 |
| 2005/0079344 A1 | 4/2005 | Zinbo et al. | 428/347 |
| 2007/0031691 A1 | 2/2007 | Forloni et al. | 428/475.2 |
| 2012/0090755 A1 | 4/2012 | Deal | 152/527 |
| 2012/0090756 A1 | 4/2012 | LeClerc | 152/527 |
| 2013/0059494 A1 | 3/2013 | Tam et al. | 442/59 |
| 2014/0045984 A1 | 2/2014 | Abad et al. | 524/440 |
| 2014/0235124 A1 | 8/2014 | Doisneau et al. | 442/149 |
| 2014/0235125 A1 | 8/2014 | Doisneau et al. | 442/149 |
| 2014/0308864 A1 | 10/2014 | Doisneau et al. | 442/149 |
| 2015/0141578 A1 | 5/2015 | Decorps et al. | B32B 7/02 |
| 2015/0151578 A1 | 6/2015 | Decorps et al. | B60C 9/02 |
| 2017/0021672 A1* | 1/2017 | Doisneau | B60C 9/0042 |

FOREIGN PATENT DOCUMENTS

| | | |
|---|---|---|
| EP | 0 172 057 A1 | 2/1986 |
| EP | 0 374 357 A2 | 6/1990 |
| EP | 0 451 425 A2 | 10/1991 |
| EP | 1 514 894 A1 | 3/2005 |
| FR | 2 967 604 A1 | 5/2012 |
| GB | 2 134 442 A | 8/1984 |
| WO | 87/03021 | 5/1987 |
| WO | 94/28568 | 12/1994 |
| WO | 2010/115860 A1 | 10/2010 |
| WO | 2010/115861 A1 | 10/2010 |
| WO | 2013/017421 A1 | 2/2013 |
| WO | 2013/017422 A1 | 2/2013 |
| WO | 2013/017423 A1 | 2/2013 |

* cited by examiner

PROCESS FOR TREATING A REINFORCING ELEMENT HAVING A FLATTENED CROSS-SECTION

FIELD OF THE INVENTION

The invention relates to a process for treating a reinforcing element, a reinforcing element that is able to be obtained by such a process, a composite element comprising such a reinforcing element and a tyre comprising such elements.

RELATED ART

The invention applies to passenger vehicles, two-wheeled vehicles, industrial vehicles selected from vans, heavy vehicles such as "heavy-duty vehicles" (i.e. underground trains, buses, heavy road transport vehicles (lorries, tractors, trailers) and off-road vehicles), agricultural or construction plant machinery, aircraft, and other transport or handling vehicles.

A tyre for a passenger vehicle comprising a carcass reinforcement that is anchored in two beads and is surmounted radially by a crown reinforcement that is itself surmounted by a tread that is joined to the beads by two sidewalls is known from the documents WO2010/115860 and WO2010/115861.

In such a tyre, the crown reinforcement comprises a working reinforcement comprising reinforcing elements embedded in an elastomer matrix. Each reinforcing element has a cross section with a flattened overall shape and extends in a main direction. The reinforcing elements are substantially parallel to one another in a direction substantially parallel to the main direction. Each reinforcing element is made of polyethylene terephthalate (PET).

In the case of a light stress (1° of side slip) on the tyre during cornering, it was found that the drift thrust or cornering stiffness was not impaired compared with conventional reinforcing elements comprising metal or textile cords. However, in the case of high stresses (greater than 5° of side slip), it was found that the drift thrust or cornering stiffness of the prior art tyre was impaired, admittedly to a minimal extent, but that this impairment was significant and likely to make the handling of the tyre less effective.

The object of the invention is to improve the drift thrust or cornering stiffness of a tyre using reinforcing elements that have a cross section with a flattened overall shape.

BRIEF DESCRIPTION OF EMBODIMENTS OF THE INVENTION

To this end, the subject of the invention is a process for treating a reinforcing element having a cross section with a flattened overall shape and extending in a main direction, and comprising at least one lateral edge made of a polymeric composition comprising a thermoplastic polymer, the lateral edge extending in a general direction substantially parallel to the main direction. The process according to the invention comprises a step of heating at least a part of the lateral edge, during which at least a part of the lateral edge is subjected to a plasma flow so as to raise the temperature of the part of the lateral edge above the melting point of the thermoplastic polymer.

A plasma makes it possible to generate, from a gas subjected to an electrical voltage, a thermal flow comprising molecules in the gaseous state, ions and electrons.

The reinforcing element obtained by virtue of the process according to the invention allows the tyre to have improved cornering stiffness or drift thrust compared with the prior art tyre, as shown by the comparative tests below.

Moreover, one of the essential features of the process is the use of a plasma flow. Specifically, the application of the plasma flow to the lateral edge makes it possible to eliminate any ridges present on this lateral edge prior to application of the plasma. The lateral edge thus does not have any ridges after application of the plasma flow.

The lateral edge of a reinforcing element having a cross section with a flattened overall shape is that portion of the contour of the reinforcing element that extends over the entire thickness of the reinforcing element.

Not having any ridges is understood as meaning that the external lateral surface delimiting the lateral edge is a continuous surface. In other words, the external lateral surface does not have any indentations or protrusions forming a discontinuity on the external lateral surface.

Specifically, such ridges would constitute rupture initiators in the adjacent compound, these initiators occurring especially in the case of high cornering stresses.

The invention thus makes it possible to physicochemically improve the interface between the compound and the reinforcing element and to avoid deterioration of this interface on account of rupture initiators.

Specifically, the inventors originating the invention explain a posteriori the improvement in the cornering stiffness through the decrease in the gradient of local stiffness between each reinforcing element and the elastomer matrix in which it is embedded, this drop in stiffness being obtained by modifying the structure of the thermoplastic polymer by heating. Thus, the shear forces between the reinforcing element and the elastomer matrix are reduced, especially in the case of high cornering stresses on the tyre.

In the invention, the local stiffness is the microhardness, which is measured by nanoindentation. Microhardness measured by nanoindentation is the resistance of a material to the penetration into this material of an indenter that is non-deformable with respect to this material.

The reinforcing element has a cross section with a flattened overall shape, that is to say that the cross section has two dimensions which extend in directions substantially perpendicular to one another and one of which is greater than the other. In other words, the reinforcing element is wider than it is thick. The cross section of the reinforcing element is the cross section in a section plane substantially perpendicular to the main direction of the reinforcing element.

Examples of cross sections with a flattened overall shape are cross sections with an oblong, elliptical, oval, rectangular, parallelogram or even lozenge shape. Preferably, the cross section has a rectangular overall shape.

The polymeric composition may comprise additives added to the thermoplastic polymer, especially at the time of forming the latter, it being possible for these additives to be, for example, agents that protect against ageing, plasticizers, fillers such as silica, clay, talc, kaolin or even short fibres; fillers may for example be used to make the surface of the reinforcing element rougher and thus contribute to improving its keying to the glue and/or its adhesion to the elastomer matrix.

The polymeric composition may comprise polymers other than the thermoplastic polymer, for example other thermoplastic polymers or elastomers, and also other non-polymeric components.

The reinforcing element is a three-dimensional element having a length G, a width L and a thickness E, each extending in a general direction substantially perpendicular to the general directions in which the two other dimensions extend and wherein G>L>E.

By definition, the thickness of the reinforcing element is the bulk, i.e. the maximum dimension of the reinforcing element in a direction substantially parallel to the general direction of the thickness of the reinforcing element.

By definition, the width of the reinforcing element is the bulk, i.e. the maximum dimension of the reinforcing element in a direction substantially parallel to the general direction of the width of the reinforcing element.

Preferably, the reinforcing element has a flattened overall shape having an aspect ratio greater than or equal to 5. The aspect ratio is defined by the ratio of the width of the reinforcing element to the thickness of the reinforcing element. Preferably, the aspect ratio is greater than or equal to 10, more preferably greater than or equal to 20 and even more preferably greater than or equal to 30.

Preferably, the heating step is carried out at atmospheric pressure, notably, when it is carried out by means of a plasma flow. Moreover, carrying out the heating step at atmospheric pressure makes it possible to install a relatively simple and inexpensive industrial installation in contrast to a process that requires a reduced pressure and thus the installation of a depressurized chamber.

Preferably, the plasma flow is generated by means of a plasma torch. The physical modification brought about by the use of a plasma torch consists of at least partial amorphization, that is to say a reduction in the level of crystallinity of the exposed part of the edge. Therefore, since this part of the edge is less organized, it has a lower microhardness.

By virtue of the power of its plasma flow, the plasma torch makes it possible to round off any ridges which are present or delimit the lateral edge and which could serve as rupture initiators at the interface between the elastomer matrix and the reinforcing element.

Preferably, the plasma is of the cold plasma type. Such a plasma, also known as a non-equilibrium plasma, is such that the temperature originates predominantly from the movement of the electrons. A cold plasma should be distinguished from a hot plasma, also known as a thermal plasma, in which the electrons but also the ions give this plasma certain properties, especially thermal properties, different from those of the cold plasma.

Advantageously, the plasma flow is generated from a gas comprising at least one oxidizing component. An oxidizing component is understood to be any component capable of increasing the degree of oxidation of one or more chemical functions present in the polymeric composition. In addition, the chemical modification brought about by the use of the gas comprising at least one oxidizing component consists of an increase in the polarity of the exposed part of the edge. Therefore, this exposed part of the edge is more hydrophilic, thereby improving the wettability of the lateral edge. In addition, the exposed part of the edge bears polar groups created by the plasma flow that are capable of reacting chemically with the elastomer matrix and any adhesive.

Advantageously, the oxidizing component is chosen from carbon dioxide ($CO_2$), carbon monoxide (CO), hydrogen sulphide ($H_2S$), carbon sulphide ($CS_2$), dioxygen ($O_2$), nitrogen ($N_2$), chlorine ($Cl_2$), ammonia ($NH_3$) and a mixture of these components. Preferably, the oxidizing component is chosen from dioxygen ($O_2$), nitrogen ($N_2$) and a mixture of these components. More preferably, the oxidizing component is air.

Preferably, the reinforcing element is made to move with respect to a source of plasma flow. Thus, it is possible to treat large quantities of reinforcing elements. A person skilled in the art will know how to choose the rate of movement, the intensity of the source of plasma flow and the distance between the source of plasma flow and the lateral edge so as to cause an increase in the temperature of the lateral edge above the melting point of the thermoplastic polymer.

In particular, in the case of a plasma flow, a very large number of parameters could be varied, such as the rate of movement V, the distance D between the lateral edge and an outlet orifice of the plasma flow, the plasma cycle time ("PCT"), the nature of the gas or else the pulse frequency of the plasma torch.

Preferably, subsequent to the step of heating the part of the lateral edge, the reinforcing element is coated with an adhesive. The adhesive used is for example of the RFL (resorcinol-formaldehyde-latex) type or, for example, as described in the publications WO2013017421, WO2013017422, WO2013017423.

Preferably, the thermoplastic polymer is semi-crystalline. A semi-crystalline polymer comprises both crystalline zones and amorphous zones.

Advantageously, the thermoplastic polymer is chosen from a polyester, a polyamide, a polyketone or a mixture of these materials, and is preferably a polyester. Examples of polyesters are terephthalate (PET), polyethylene naphthalate (PEN), polybutylene terephthalate (PBT), polybutylene naphthalate (PBN), polypropylene terephthalate (PPT) or polypropylene naphthalate (PPN). Examples of polyamides are for example aliphatic polyamides such as nylon.

Preferably, the reinforcing element has a thickness ranging from 0.05 to 1 mm, more preferably from 0.10 to 0.70 mm. For example, thicknesses ranging from 0.20 to 0.60 mm have been found to be quite suitable for most uses.

Advantageously, the width of the reinforcing element is greater than or equal to 2.5 mm, preferably greater than or equal to 5 mm and more preferably greater than or equal to 10 mm.

In one preferred embodiment, the reinforcing element is made of a film of the polymeric composition.

Preferably, the film is multiaxially drawn.

Any film of the polymeric composition that is multiaxially drawn, that is to say drawn or oriented in more than one direction, can be used. Such multiaxially drawn films are well known and essentially used to date especially in the packaging industry.

These films and the methods for obtaining them are described in numerous documents, for example GB2134442, DE3621205, U.S. Pat. Nos. 4,876,137, 4,867,937, 5,409,657, US2007/0031691 and WO2010/115861.

Preferably, regardless of the tensile direction considered, the film has an extension modulus of greater than 500 MPa (especially between 500 and 4000 MPa), more preferably greater than 1000 MPa (especially between 1000 and 4000 MPa), and even more preferably greater than 2000 MPa. Values of modulus E between 2000 and 4000 MPa are particularly desirable, especially for reinforcing tyres.

According to one preferred embodiment, regardless of the tensile direction considered, the film has a maximum tensile stress, denoted $\sigma_{max}$, of greater than 80 MPa (especially between 80 and 500 MPa), more preferably greater than 100 MPa (especially between 100 and 500 MPa). Values of stresses $\sigma_{max}$ greater than 150 MPa, in particular between 150 and 500 MPa, are particularly desirable, especially for reinforcing tyres.

According to another preferred embodiment, regardless of the tensile direction considered, the yield point, denoted Yp, of the film is located above 3% elongation, especially between 3 and 15%. Values of Yp above 4%, in particular between 4 and 12%, are particularly desirable, especially for reinforcing tyres.

According to another preferred embodiment, regardless of the tensile direction considered, the film has an elongation at break, denoted Ar, which is greater than 20% (especially between 20 and 200%), more preferably greater than 50%. Values of Ar between 30 and 200% are particularly desirable, especially for reinforcing tyres.

The abovementioned mechanical properties are well known to a person skilled in the art, being deduced from force-elongation curves, measured for example according to the standard ASTM D638-02 for strips having a thickness greater than 1 mm, or else according to the standard ASTM D882-09 for thin sheets or films, the thickness of which is at most equal to 1 mm; the above values of modulus E and stress $\sigma_{max}$, expressed in MPa, are calculated with respect to the initial cross section of the test specimen subjected to the tensile test.

The film used is preferably of the thermally stabilized type, i.e. it has undergone, after drawing, one or more heat treatments intended, in a known manner, to limit the thermal contraction (or shrinkage) thereof at high temperature; such heat treatments may especially consist of post-curing or hardening treatments, or combinations of such post-curing or hardening treatments.

Thus, and preferably, the film used has, after 30 min at 150° C., a contraction relative to its length which is less than 5%, preferably less than 3% (measured, unless otherwise indicated, according to ASTM D1204-08).

The melting point Tf of the thermoplastic polymer is preferably chosen to be above 100° C., more preferably above 150° C., in particular above 200° C. especially in the case of reinforcing tyres.

Examples of films, especially multiaxially drawn PET films, are the biaxially drawn PET films sold under the names "Mylar" and "Melinex" (DuPont Teijin Films), or else "Hostaphan" (Mitsubishi Polyester Film).

Another subject of the invention is a reinforcing element that is able to be obtained by a process as described above.

Yet another subject of the invention is a composite element comprising at least one reinforcing element as defined above embedded in an elastomer matrix.

In one preferred embodiment, the composite element is in the overall form of a strip. The width L' and thickness E' of the composite element are such that L'>E', preferably L'>10.E'. In one embodiment, the composite element forms a belt for a conveyor or else a band.

Preferably, the composite element comprises a plurality of reinforcing elements as defined above that are embedded in the elastomer matrix and are arranged substantially parallel to one another in a direction substantially parallel to the main direction.

The elastomer matrix is based on at least one elastomer.

Preferably, the elastomer is a diene elastomer. As is known, diene elastomers can be classified into two categories: "essentially unsaturated" or "essentially saturated". The term "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come under the above definition and can especially be described as "essentially saturated" diene elastomers (low or very low content of units of diene origin, always less than 15%). In the category of "essentially unsaturated" diene elastomers, the term "highly unsaturated" diene elastomer is understood to mean in particular a diene elastomer having a content of units of diene origin (conjugated dienes) which is greater than 50%.

Although it is applicable to any type of diene elastomer, the present invention is preferably carried out with a diene elastomer of the highly unsaturated type.

This diene elastomer is more preferably chosen from the group consisting of polybutadienes (BRs), natural rubber (NR), synthetic polyisoprenes (IRs), various butadiene copolymers, various isoprene copolymers and mixtures of these elastomers, such copolymers being especially chosen from the group consisting of butadiene/styrene copolymers (SBRs), isoprene/butadiene copolymers (BIRs), isoprene/styrene copolymers (SIRs) and isoprene/butadiene/styrene copolymers (SBIRs).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), various isoprene copolymers and mixtures of these elastomers. The isoprene elastomer is preferably natural rubber or a synthetic polyisoprene of the cis-1,4 type. Among these synthetic polyisoprenes, use is preferably made of polyisoprenes having a content (mol %) of cis-1,4 bonds of greater than 90%, even more preferably greater than 98%.

According to one preferred embodiment, each layer of rubber composition contains 50 to 100 phr of natural rubber. According to other preferred embodiments, the diene elastomer may consist, in full or in part, of another diene elastomer such as, for example, an SBR elastomer used as a blend with another elastomer, for example of the BR type, or used alone.

The elastomer matrix may contain a single diene elastomer or several diene elastomers, the latter possibly being used in combination with any type of synthetic elastomer other than a diene elastomer, or even with polymers other than elastomers. The rubber composition may also contain all or some of the additives customarily used in rubber matrices intended for the manufacture of tyres, such as, for example, reinforcing fillers such as carbon black or silica, coupling agents, anti-ageing agents, antioxidants, plasticizing agents or extender oils, whether the latter be of the aromatic or non-aromatic kind (especially oils that are very weakly aromatic or non-aromatic, for example of the naphthene or paraffin type, with a high or preferably a low viscosity, MES or TDAE oils), plasticizing resins with a high Tg in excess of 300° C., processing aids that make the compositions easier to process in the raw state, tackifying resins, anti-reversion agents, methylene acceptors and donors such as HMT (hexamethylenetetramine) or H3M (hexamethoxymethylmelamine) for example, reinforcing resins (such as resorcinol or bismaleimide), known adhesion promoting systems of the metallic salts type for example, especially cobalt salts, nickel salts or lanthanide salts and a crosslinking or vulcanization system.

Preferably, the system for crosslinking the elastomer matrix is a system referred to as a vulcanization system, that is to say one based on sulphur (or on a sulphur donor agent) and a primary vulcanization accelerator. Various known vulcanization activators or secondary accelerators may be added to this basic vulcanization system. Sulphur is used at a preferred content of between 0.5 and 10 phr, and the primary vulcanization accelerator, for example a sulphenamide, is used at a preferred content of between 0.5 and 10 phr. The content of reinforcing filler, for example of carbon black or silica, is preferably greater than 50 phr, especially between 50 and 150 phr.

All carbon blacks, especially blacks of the HAF, ISAF, SAF type, conventionally used in tyres (blacks referred to as tyre grade blacks) are suitable as carbon black. Among the latter, more particular mention will be made of carbon blacks of 300, 600 or 700 (ASTM) grade (for example N326, N330, N347, N375, N683, N772). Precipitated or pyrogenic silicas having a BET surface area of less than 450 m2/g, preferably of 30 to 400 m2/g, are especially suitable as silicas.

A person skilled in the art will know, in the light of the present description, how to adjust the formulation of the rubber composition in order to reach the desired levels of properties (especially elastic modulus) and adapt the formulation to suit the specific application envisaged.

Preferably, the elastomer matrix has, in the crosslinked state, a secant tensile modulus, at 10% elongation, which is between 4 and 80 MPa, more preferably between 4 and 70 MPa; values between especially 25 and 60 MPa have proved to be particularly suitable for reinforcing the crown reinforcements of tyres. Modulus measurements are carried out under tension, unless otherwise indicated, in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with the standard ASTM D 1349 of 1999).

Advantageously, the reinforcing element is coated with a layer of an adhesive between the reinforcing element and the elastomer matrix.

The adhesive used is for example of the RFL (resorcinol-formaldehyde-latex) type or, for example, as described in the publications WO2013017421, WO2013017422, WO2013017423.

Another subject of the invention is a tyre comprising a reinforcing element as defined above or a composite element as defined above.

In one embodiment, the tyre comprises a crown surmounted by a tread, two sidewalls, two beads, each sidewall connecting each bead to the crown, a carcass reinforcement that is anchored in each of the beads and extends through the sidewalls towards the crown, the carcass reinforcement comprising the reinforcing element or the composite element.

Preferably, in this embodiment, the main direction forms an angle ranging from 80° to 90°, preferably ranging from 85° to 90°, with the circumferential direction of the tyre.

In another embodiment, the tyre comprises a crown surmounted by a tread, two sidewalls, two beads, each sidewall connecting each bead to the crown, a carcass reinforcement that is anchored in each of the beads and extends through the sidewalls towards the crown, a crown reinforcement that is radially interposed between the carcass reinforcement and the tread, the crown reinforcement comprising the reinforcing element or the composite element.

Preferably, in this embodiment, the main direction forms an angle ranging from 0° to 80°, preferably ranging from 5° to 50°, with the circumferential direction of the tyre.

In one embodiment, the tyre is intended for a passenger vehicle including especially 4×4 vehicles and SUVs (Sport Utility Vehicles).

In another embodiment, the tyre is intended for an industrial vehicle including vans, heavy vehicles such as "heavy-duty" vehicles (i.e. underground trains, buses, heavy road transport vehicles (lorries, tractors, trailers) and off-road vehicles), agricultural or construction plant machinery, aircraft, and other transport or handling vehicles.

BRIEF DESCRIPTION OF FIGURES

The invention will be better understood from reading the following description, given solely by way of non-limiting example and with reference to the drawings in which.

DETAILED DESCRIPTION

In the following description, when using the term "radial", it is appropriate to make a distinction between several different uses of the word by a person skilled in the art. Firstly, the expression refers to a radius of the tyre. It is within this meaning that a point P1 is said to be "radially inside" a point P2 (or "radially on the inside" of the point P2) if it is closer to the rotation axis of the tyre than the point P2. Conversely, a point P3 is said to be "radially outside" a point P4 (or "radially on the outside" of the point P4) if it is further away from the rotation axis of the tyre than the point P4. Progress will be said to be "radially inwards (or outwards)" when it is in the direction of smaller (or larger) radii. It is this sense of the word that applies also when radial distances are being discussed.

On the other hand, a reinforcing element or a reinforcement is said to be "radial" when the reinforcing element or the reinforcing elements of the reinforcement make an angle greater than or equal to 65° and less than or equal to 90°, preferably ranging from 80° to 90°, and more preferably ranging from 85° to 90°, with the circumferential direction.

An "axial" direction is a direction parallel to the axis of rotation of the tyre. A point P5 is said to be "axially inside"

a point P6 (or "axially on the inside" of the point P6) if it is closer to the median plane M of the tyre than the point P6. Conversely, a point P7 is said to be "axially outside" a point P8 (or "axially on the outside" of the point P8) if it is further away from the median plane M of the tyre than the point P8.

The "median plane" M of the tyre is the plane which is normal to the rotation axis of the tyre and which is situated equidistantly from the annular reinforcing structures of each bead.

Furthermore, any range of values denoted by the expression "from a to b" means the range of values ranging from the end point "a" to the end point "b", i.e. including the strict end points "a" and "b". Any range of values denoted by the expression "between a and b" means the range of values varying between the end point "a" and the end point "b", i.e. excluding the strict end points "a" and "b".

Examples of a Tyre and a Reinforcing Element According to the Invention

Figure 1:
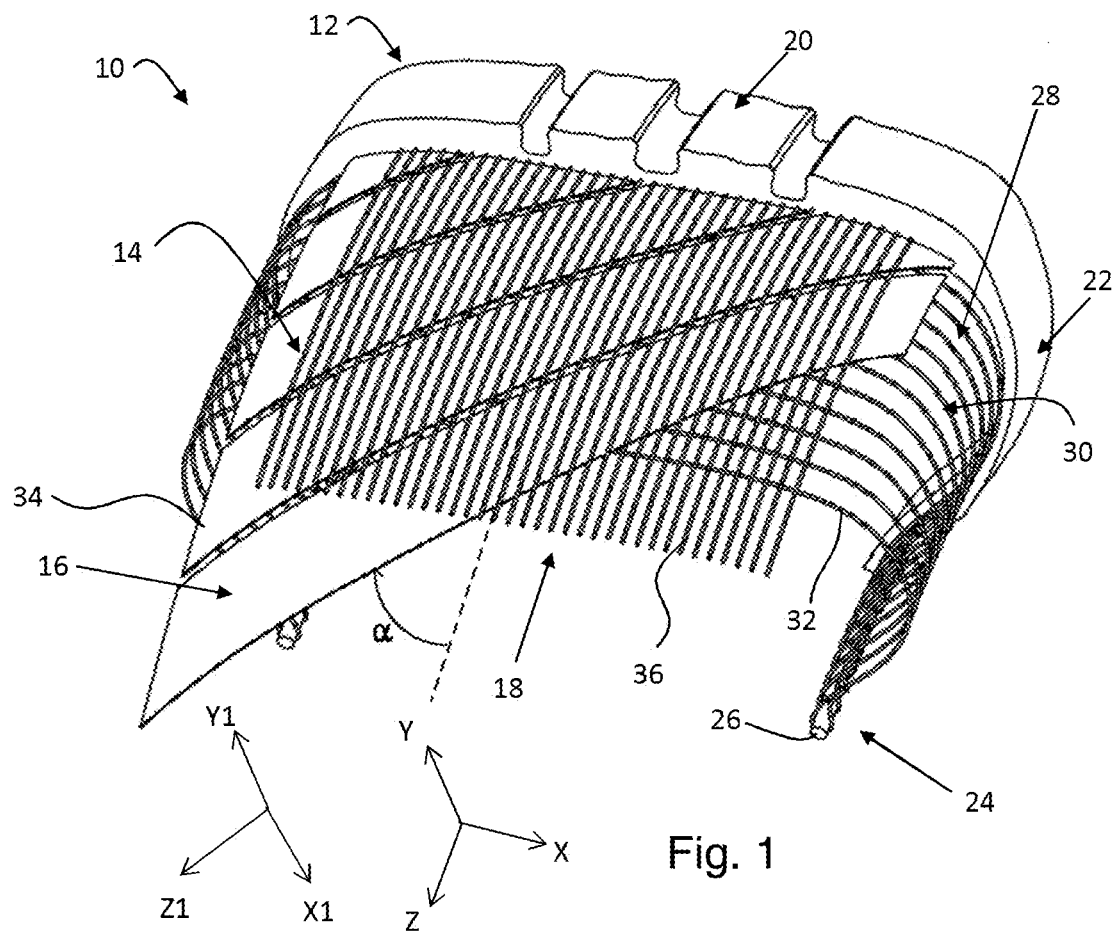
FIG. 1 is a sectional view of a tyre according to the invention.
Figure 2:
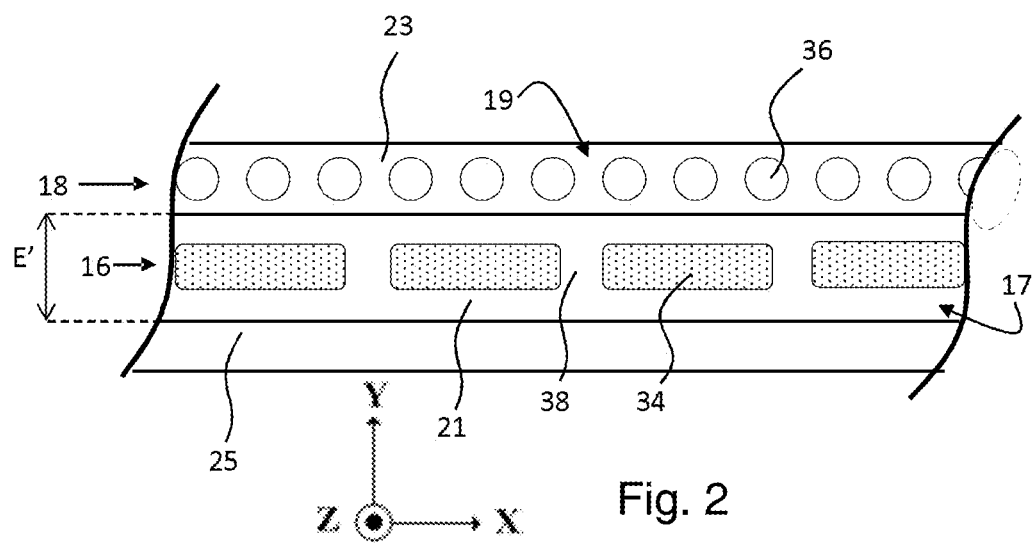
FIG. 2 is a sectional view of a composite element according to the invention that forms a working ply of the tyre in FIG. 1.

FIGS. 1 and 2 show a reference frame X, Y, Z corresponding to the usual axial (X), radial (Y) and circumferential (Z) directions, respectively, of a tyre.

FIGS. 1 and 2 show a tyre according to the invention and denoted by the general reference 10. The tyre 10 substantially exhibits symmetry of revolution about an axis substantially parallel to the axial direction X. The tyre 10 is intended in this case for a passenger vehicle.

The tyre 10 comprises a crown 12 comprising a crown reinforcement 14 comprising a working reinforcement 16 comprising a working ply 17 of reinforcing elements and a hoop reinforcement 18 comprising a hooping ply 19. The crown reinforcement 14 is surmounted by a tread 20. In this case, the hoop reinforcement 18, in this case the hooping ply 19, is radially interposed between the working reinforcement 16 and the tread 20. Two sidewalls 22 extend the crown 12 radially inwards. The tyre 10 also comprises two beads 24 that are radially inside the sidewalls 22 and each comprise an annular reinforcing structure 26, in this instance a bead wire, and a radial carcass reinforcement 28. The crown reinforcement 14 is radially interposed between the carcass reinforcement 28 and the tread 20. Each sidewall 22 connects each bead 24 to the crown 14.

The carcass reinforcement 28 preferably comprises a single carcass ply 30 of radial textile reinforcing elements 32. The carcass reinforcement 28 is anchored to each of the beads 24 by being turned up around the bead wire 26, so as to form, within each bead 24, a main strand extending from the beads 24 through the sidewalls 22 towards the crown 12, and a turn-up strand, the radially outer end of the turn-up strand being radially on the outside of the bead wire 26. The carcass reinforcement 30 thus extends from the beads 24 through the sidewalls 22 towards the crown 12. In this embodiment, the carcass reinforcement 28 also extends axially through the crown 12.

The working ply 16 forms a composite element according to the invention, comprising reinforcing elements 34 according to the invention that extend in a main direction Z1 that forms an angle α ranging from 0° to 80°, preferably ranging from 5° to 50°, more preferably ranging from 15° to 40°, and even more preferably ranging from 20° to 30°, and in this case equal to 26°, with the circumferential direction Z of the tyre 10. Alternatively, the working reinforcement 16 comprises several working plies, for example two working plies, each comprising reinforcing elements 34 according to the invention.

The hooping ply 19 comprises hoop reinforcing elements 36 that form an angle of at most equal to 10°, preferably ranging from 5° to 10°, with the circumferential direction Z of the tyre 10. In this instance, the hoop reinforcing elements 36 are plied yarns made of aramid, each plied yarn consisting of two 167-tex spun yarns which have been twisted together (on a direct cabling machine) at 230 turns/metre. Alternatively, use could be made of other textile materials, such as PET, but also metal reinforcing elements.

Each working ply 16, hooping ply 19 and carcass ply 30 comprises an elastomer matrix 21, 23 and 25, respectively, in which the reinforcing elements of the corresponding ply are embedded. The rubber compositions of the elastomer matrices of the working ply 16, hooping ply 19 and carcass ply 30 are conventional compositions for the calendering of reinforcing elements conventionally comprising a diene elastomer, for example natural rubber, a reinforcing filler, for example carbon black and/or silica, a crosslinking system, for example a vulcanizing system, preferably containing sulphur, stearic acid and zinc oxide, and possibly a vulcanization accelerant and/or retarder and/or various additives.

The reinforcing elements 34 of the composite element 16 are arranged side-by-side. The reinforcing elements 34 extend parallel to one another. The composite element 16 comprises bridges 38 of the elastomer matrix that separate two successive reinforcing elements 34.

Figure 3:
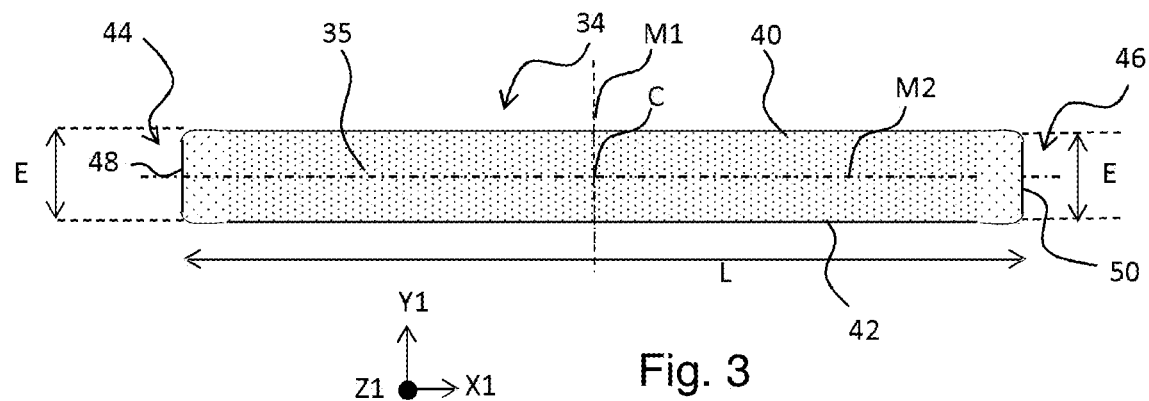
FIG. 3 is a sectional view of a reinforcing element according to a first embodiment of the invention of the composite element in FIG. 2.
Figure 4:
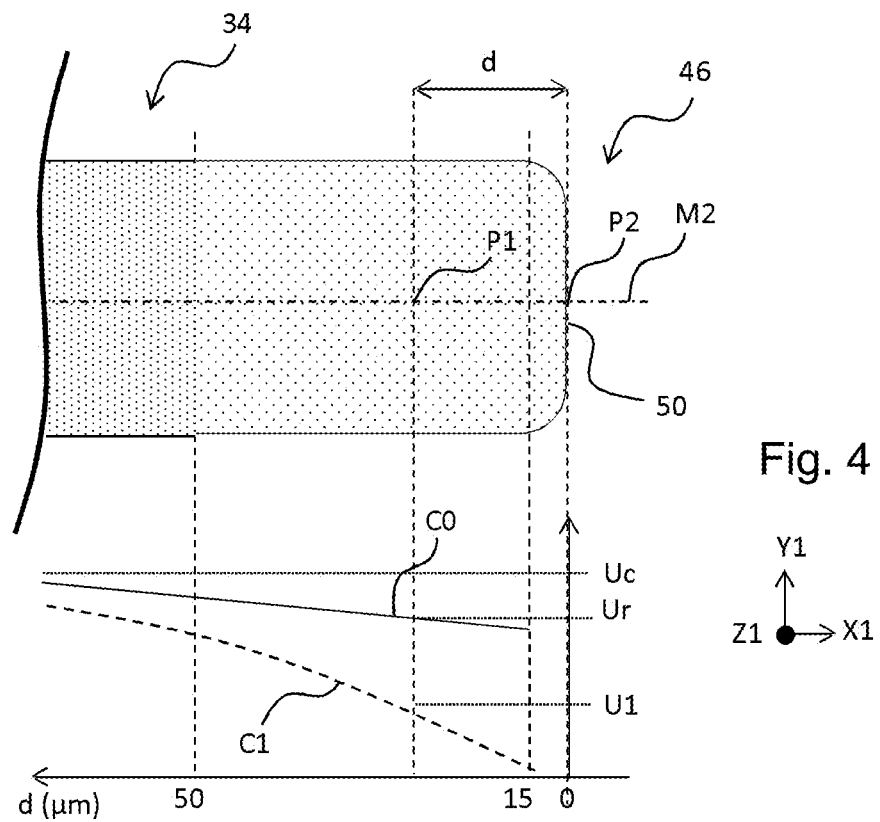
FIG. 4 is an enlargement of a lateral edge of the reinforcing element in FIG. 3.

FIGS. 3 and 4 show the reinforcing element 34 of the composite element 16, forming a reinforcing element according to a first embodiment of the invention.

FIG. 3 shows a reference frame X1, Y1, Z1 corresponding to the general directions in which the width (X1), the thickness (Y1) and the length (Z1), respectively, of a three-dimensional object extend.

The reinforcing element 34 has a length G extending in a main general direction Z1. In the tyre 10, the main direction Z1 forms an angle α with the circumferential direction Z of the tyre 10. The reinforcing element 34 has a width L extending in a general direction X1. The reinforcing element 34 has a thickness E extending in a general direction Y1.

In the plane perpendicular to the main direction Z1, the reinforcing element 34 has a cross section with a flattened overall shape. The cross section may have an oblong, elliptical, oval, rectangular, parallelogram or lozenge shape. The reinforcing element 34 has a cross section with a rectangular overall shape.

The reinforcing element 34 has an aspect ratio greater than or equal to 5, preferably greater than or equal to 10, more preferably greater than or equal to 20 and even more preferably greater than or equal to 30.

The reinforcing element 34 consists here of a film 35 of polymeric composition comprising at least one thermoplastic polymer. The thermoplastic polymer is semi-crystalline and is chosen from a polyester, a polyamide, a polyketone or a mixture of these materials, and is preferably a polyester.

In this instance, the reinforcing element 34 consists of a multiaxially drawn film 35 of polyethylene terephthalate (PET), in this case a biaxially drawn film 35 of polyethylene terephthalate (PET) ("Mylar A" from DuPont Teijin Films). Other thermoplastic polymers could be used, for example other polyesters or nylon.

The reinforcing element 34 has a thickness E ranging from 0.05 to 1 mm, preferably from 0.1 to 0.7 mm, and in this case equal to 0.5 mm. The reinforcing element 34 has a width L greater than or equal to 2.5 mm, preferably greater than or equal to 5 mm and more preferably greater than or equal to 10 mm, and in this case equal to 25 mm.

In this case, the aspect ratio is equal to 50.

The reinforcing element 34 comprises two longitudinal faces 40, 42 and two lateral edges 44, 46, each comprising an external lateral surface 48, 50. Each lateral edge 44, 46 extends in a general direction substantially parallel to the main direction Z1. Neither of the lateral edges 44, 46 has any ridges. Thus, each external lateral surface 48, 50 delimiting each lateral edge 44, 46 is a continuous surface. In other words, neither of the external lateral surfaces 48, 50 has any indentations or protrusions forming a discontinuity on the external lateral surface 48, 50.

Each lateral edge 44, 46 is made of the polymeric composition comprising the thermoplastic polymer, in this case PET.

FIG. 3 shows a first median plane M1 of the width L of the reinforcing element 34, and a second median plane M2 of the thickness of the reinforcing element 34. The first and second median planes M1, M2 extend substantially parallel to the main direction Z1 and are substantially perpendicular to one another. The central point C, defined as the point of intersection between the first and second median planes M1, M2, is shown in the section plane in FIG. 3.

FIG. 4 shows the lateral edge 46 of the reinforcing element 34. The lateral edge 46 has a point P1, known as the measuring point, belonging to the second median plane M2. The measuring point P1 is distant from a point P2, known as the end point, belonging to the second median plane M2 and from the external surface 50 delimiting the lateral edge 46, by a distance d in a range of [0 µm; 50 µm], preferably [15 µm, 50 µm]. In this case d=15 µm.

Optionally, the reinforcing element comprises a central part delimited at least partially by the lateral edge, the central part being made at least partially of the polymeric composition. The central part comprises the central point, when the central point is made of the polymeric composition, and the point of the polymeric composition that is closest to the central point, when the central point is not made of the polymeric composition. In this case, the central point C is made of the polymeric composition, i.e. in this case PET. The point P1 is also made of the polymeric composition.

The microhardness measurements at the central point and at the measuring point are all carried out in the same material, in this case the polymeric composition. In particular, the measurement of the microhardness at the central point is carried out at the central point when the latter is realized in the polymeric composition. When the central point is made of a different material than the polymeric composition, the value Uc is that of the closest point. The closest point is understood to be the closest point in terms of distance starting from the central point. Thus, the variation in microhardness is not associated with a change in material, for example as would be the case in a composite material comprising two materials of different natures (e.g. metal/thermoplastic composite), but with variations in properties within one and the same material, which, on account of its variable microstructure, give it different local mechanical properties.

FIG. 4 also shows the variation in the microhardness U of the polymeric composition depending on the distance d from the external lateral surface 50 in a direction substantially parallel to the direction X1. The curve C0 (continuous curve) shows the variation in the microhardness U of a reinforcing element of the prior art and not according to the invention. The curve C1 (dashed curve) shows the variation in the microhardness U of the reinforcing element 34.

Uc represents the average value of the microhardness of the reinforcing element 34 measured at the central point C. U1 represents the average value of the microhardness of the reinforcing element 34 measured at the measuring point P1. Ur represents the average value of the microhardness of a reinforcing element of the prior art and thus not according to the invention at the measuring point P1. What has just been described for the lateral edge 46 applies mutatis mutandis to the lateral edge 44.

Each reinforcing element 34 is coated with a layer of adhesion primer and a layer of adhesive coating the layer of adhesion primer. Alternatively, the adhesive layer directly coats the polymeric composition (absence of the layer of adhesion primer).

The adhesion primer generally comprises an epoxy resin, well known to a person skilled in the art. The adhesive comprises an RFL adhesive or a phenol-aldehyde resin based on at least one polyphenol and a polyaldehyde such as those described in the publications WO2013017421, WO2013017422, WO2013017423. Alternatively, other types of adhesive can be used, for example thermoplastic adhesives.

Preferably, the adhesive comprises at least one diene elastomer. Such an elastomer makes it possible to improve the tack in the green state and/or cured state of the adhesive with the rubber matrix. Advantageously, the diene elastomer is chosen from natural rubber, a copolymer of styrene and butadiene, a terpolymer of vinylpyridine, styrene and butadiene, and a mixture of these diene elastomers.

Figure 5:
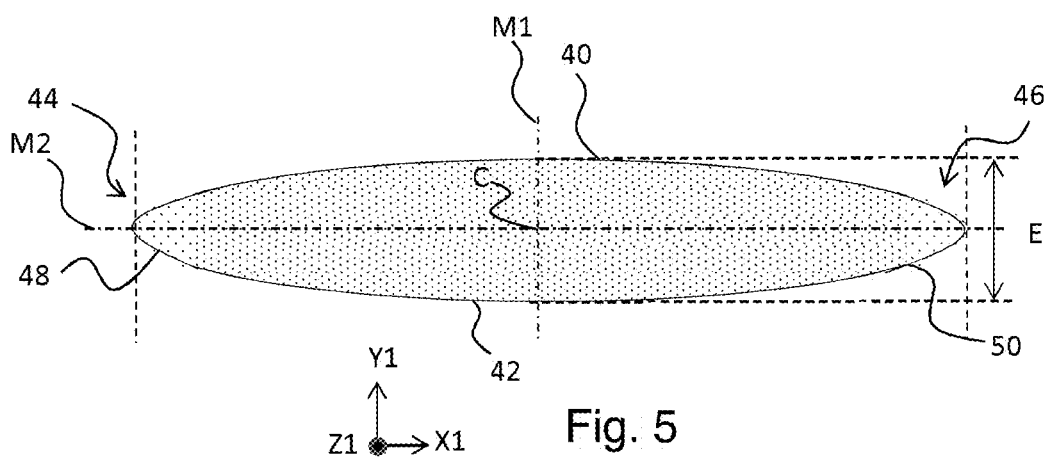
FIG. 5 is a view similar to that of FIG. 3 of a reinforcing element according to a second embodiment of the invention.
Figure 6:
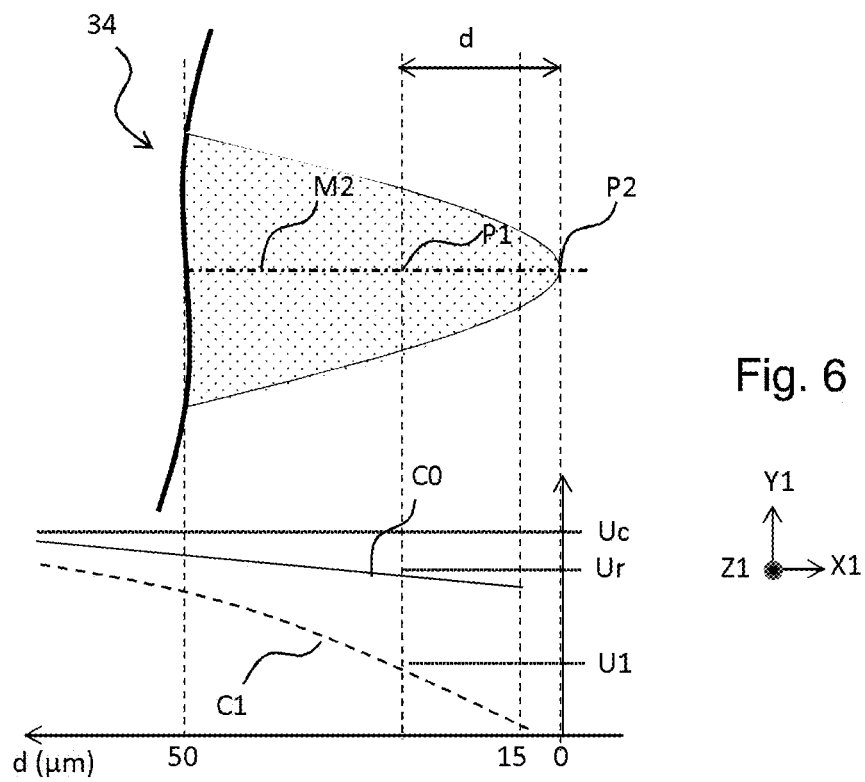
FIG. 6 is a view similar to that of FIG. 4 of the reinforcing element in FIG. 5.

FIGS. 5 and 6 show a reinforcing element 34 according to a second embodiment.

In contrast to the reinforcing element 34 according to the first embodiment, the reinforcing element according to the second embodiment has a cross section with an overall shape that is elliptical before the lateral edge is subjected to the plasma flow.

Figure 7:
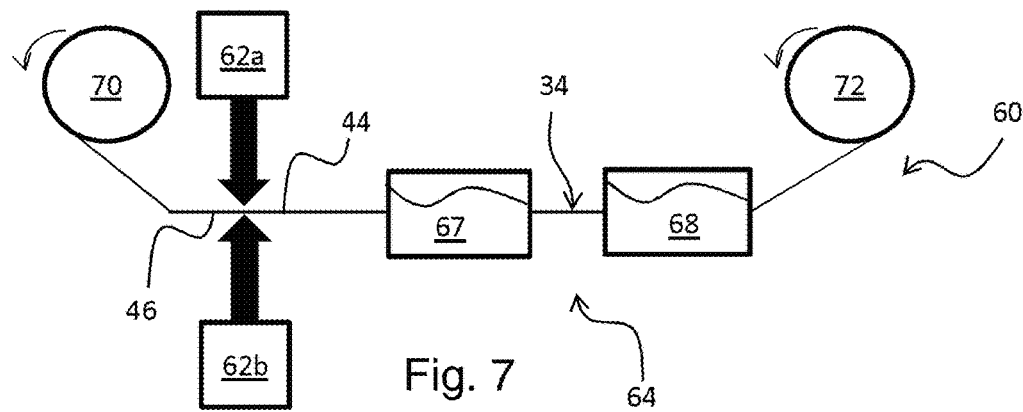
FIG. 7 is a diagram of a plant for treating a reinforcing element.
Figure 8:
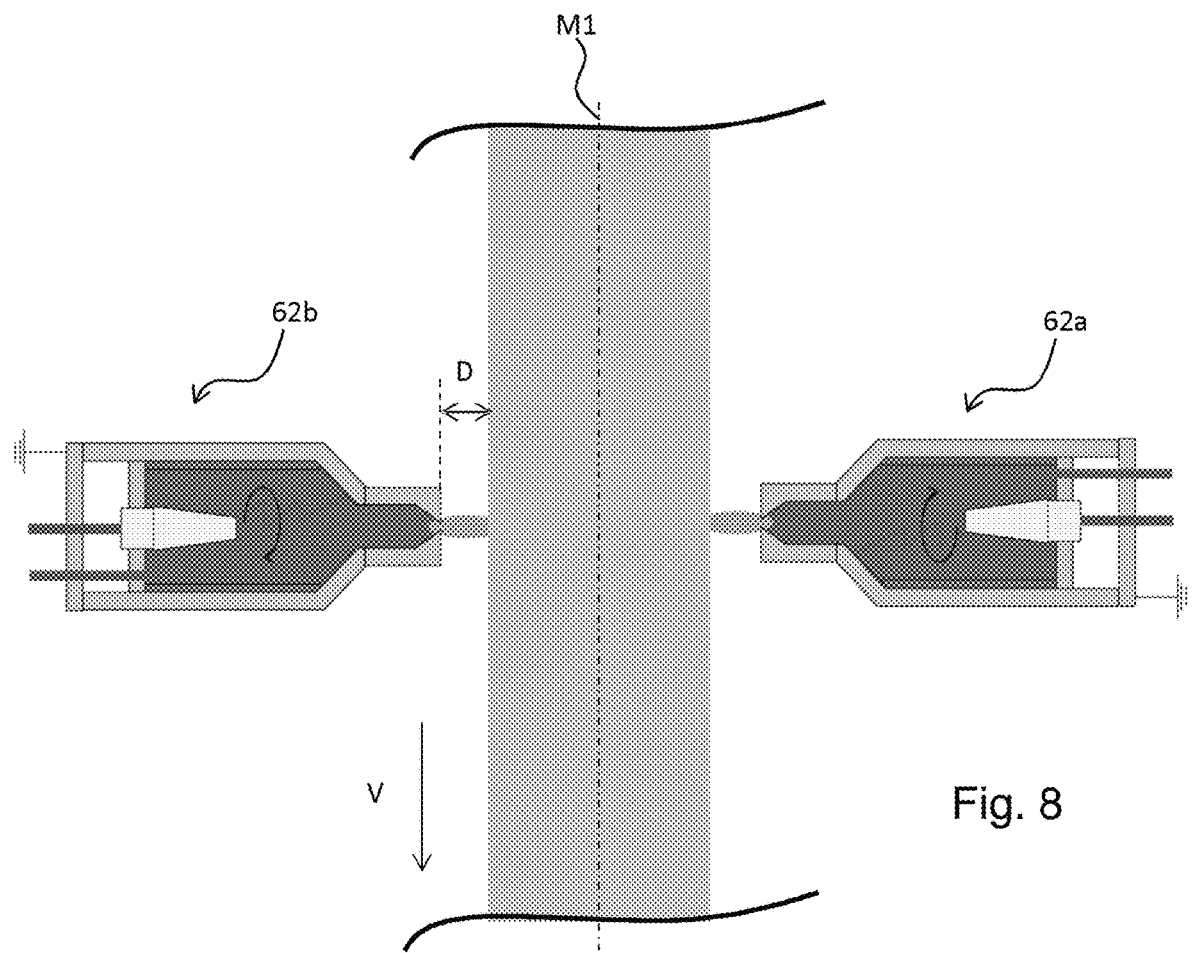
FIG. 8 is a diagram of devices for generating plasma flows of the plant in FIG. 7.
Figure 9:
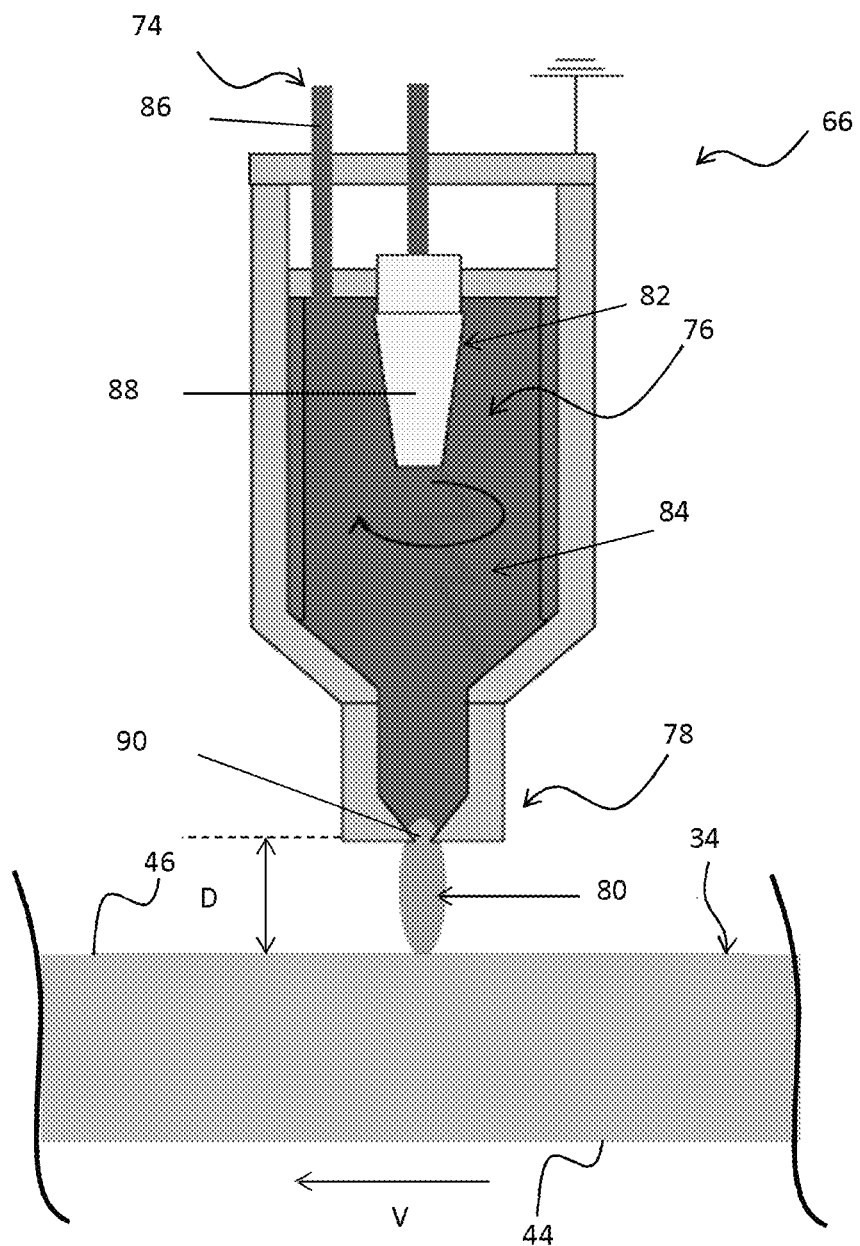
FIG. 9 is a detailed diagram of a device for generating a plasma flow of the plant in FIG. 7.

Example of a Process According to the Invention for Obtaining the Reinforcing Element According to the Invention FIGS. 7 to 9 show a plant for treating the reinforcing element 34, making it possible to implement a treatment process, especially using a plasma torch. The plant is denoted by the overall reference 60.

The plant 60 comprises two devices 62a, 62b for generating a plasma flow and a device 64 for coating the reinforcing element 34.

A plasma makes it possible to generate, from a gas subjected to an electrical voltage, a thermal flow comprising molecules in the gaseous state, ions and electrons. Advantageously, the plasma is of the cold plasma type. Such a plasma, also known as a non-equilibrium plasma, is such that the temperature originates predominantly from the movement of the electrons. A cold plasma should be distinguished from a hot plasma, also known as a thermal plasma, in which the electrons but also the ions give this plasma certain properties, especially thermal properties, different from those of the cold plasma.

Each device 62a, 62b comprises a plasma torch 66 illustrated in detail in FIG. 9. Each device 62a, 62b is intended to respectively treat at least a part of each lateral edge 44, 46. The coating device 64 comprises a first bath 67 containing the adhesion primer and a second bath 68 containing the adhesive, in this case an adhesive of the RFL type.

The devices 62a, 62b are arranged on either side of the reinforcing element 34, in this case substantially symmetrically with respect to the median plane M1 of the reinforcing element 34.

The plant 60 also comprises two, upstream and downstream storage reels respectively denoted by the references 70, 72. The upstream reel 70 carries the untreated reinforcing element 34 while the reel 72 carries the reinforcing element 34 plasma-treated by means of the devices 62a, 62b and coated with the adhesion primer and the adhesive by means of the coating device 64. The devices 62a, 62b and 64 are arranged in this order between the reels 70, 72 in the running direction of the reinforcing element 34. The devices 62a, 62b are situated upstream with respect to the device 64 in the running direction of the reinforcing element 34.

FIG. 8 shows the devices 62a, 62b for generating a plasma flow, in this case plasma torches 66 sold by Plasmatreat GmbH. Each plasma torch 66 is supplied with an alternating current having a voltage of less than 360 V and a frequency of between 15 and 25 kHz.

With reference to FIG. 9, the plasma torch 66 comprises means 74 for supplying gas to a chamber 76 for generating the plasma flow, and also means 78 for discharging the plasma generated in the chamber 76 in the form of a plasma flow 80, in this case a plasma jet. The plasma torch 66 also comprises means 82 for generating a rotating electric arc 84 in the chamber 76.

The supply means 74 comprise an inlet duct 86 for admitting the gas into the chamber 76. The means 82 for generating the electric arc comprise an electrode 88. The discharge means 78 comprise an outlet orifice 90 for the plasma flow 80.

Figure 10:
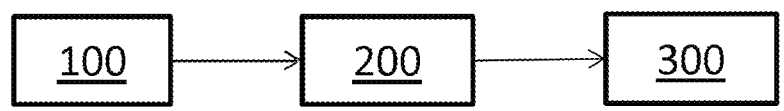
FIG. 10 is a diagram illustrating steps in the process for treating the reinforcing element according to the invention.

FIG. 10 shows a diagram illustrating the main steps 100 to 300 in the treatment process for manufacturing the reinforcing element 34 according to the invention.

During a heating step 100, at least a part of each lateral edge 44, 46 is subjected to the flow 80 generated by means of two plasma torches 66. During this step 100, the reinforcing element 34 is treated continuously. The treatment process is carried out at atmospheric pressure. The use of an atmospheric-pressure plasma makes it possible to install a relatively simple and inexpensive industrial plant, unlike a process that requires the use of a reduced-pressure plasma that is associated with the installation of a depressurized chamber.

Thus, during this step 100, the part of each lateral edge 44, 46 is subjected to a plasma flow from a plasma flow source so as to raise the temperature of each part of each lateral edge 44, 46 above the melting point Tf of the thermoplastic polymer. Thus, the structure of the thermoplastic polymer is amorphized.

The flow 80 is obtained from a gas comprising at least one oxidizing component. An oxidizing component is understood to be any component capable of increasing the degree of oxidation of the chemical functions present in the polymeric composition and in particular in the thermoplastic polymer.

Advantageously, the oxidizing component is chosen from carbon dioxide ($CO_2$), carbon monoxide (CO), hydrogen sulphide ($H_2S$), carbon sulphide ($CS_2$), dioxygen ($O_2$), nitrogen ($N_2$), chlorine ($Cl_2$), ammonia ($NH_3$) and a mixture of these components. More preferably, the oxidizing component is chosen from dioxygen ($O_2$), nitrogen ($N_2$) and a mixture of these components. Preferably, the oxidizing component is air. In this case, the flow 80 is obtained from a mixture of air and nitrogen at a flow rate of 2400 L/h.

The orifice 90 is disposed opposite each lateral edge 44, 46 to be treated, in this case opposite each external surface 48, 50. The orifice 90 is situated at a constant distance D from each lateral edge 44, 46. For example, this distance is between 1 mm and 20 mm and preferably between 2 mm and 10 mm.

The reinforcing element 34 is made to move with respect to at least one source of plasma flow, in this case with respect to two sources of plasma flow, at an average speed V of between 1 and 100 m·min$^{-1}$ and preferably between 1 and 50 m·min$^{-1}$. The average speed V is equal to the ratio between the distance covered by the plasma flow 80 with respect to the edge to be exposed and a predetermined time taken for this distance to be covered, in this instance 30 s. The movement of the flow with respect to the reinforcing element 34 can be rectilinear or curved or a mixture of the two. In this instance, the reinforcing element 34 has a uniform continuous rectilinear movement with respect to the sources of plasma flow.

Next, during a step 200, the reinforcing element 34 is coated with the adhesion primer in the first bath 67.

Then, in a step 300, following steps 100 and 200, the reinforcing element 34 is coated with the adhesive in the second bath 68.

Further subsequent steps that are not shown can also be implemented. By way of example, a draining step (for example by blowing, calibrating) to remove the excess adhesive; then a drying step, for example by passing into an oven (for example for 30 s at 180° C.) and finally a heat treatment step (for example for 30 s at 230° C.) could be carried out.

A person skilled in the art will readily understand that the final adhesion between the reinforcing element 34 and the elastomer matrix in which it is embedded is definitively provided during the final curing of the tyre of the invention.

Comparative Tests

In a first test, two reinforcing elements 34, 34' and a prior art reinforcing element T were compared. The reinforcing elements 34, 34' are in accordance with the invention and were obtained by the treatment process described above with respective running rates and distances with respect to the outlet orifice of the plasma flow of
V=10 m·min$^{-1}$ and D=3.5 mm (element 34 shown in FIG. 12) and V=10 m·min$^{-1}$ and D=1 mm (element 34'). The reinforcing element T was not treated by the process described above and is shown in FIG. 13.

Figure 12:
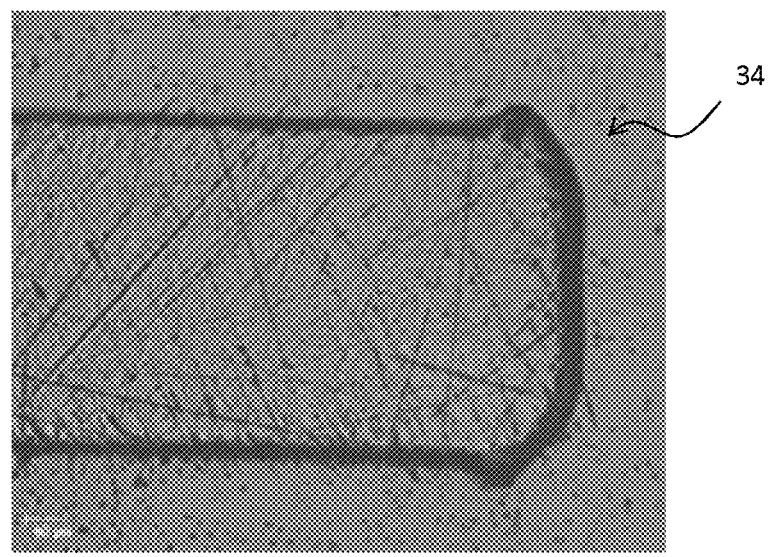
FIG. 12 is a sectional view of a reinforcing element according to the invention obtained by a plasma treatment process.
Figure 13:
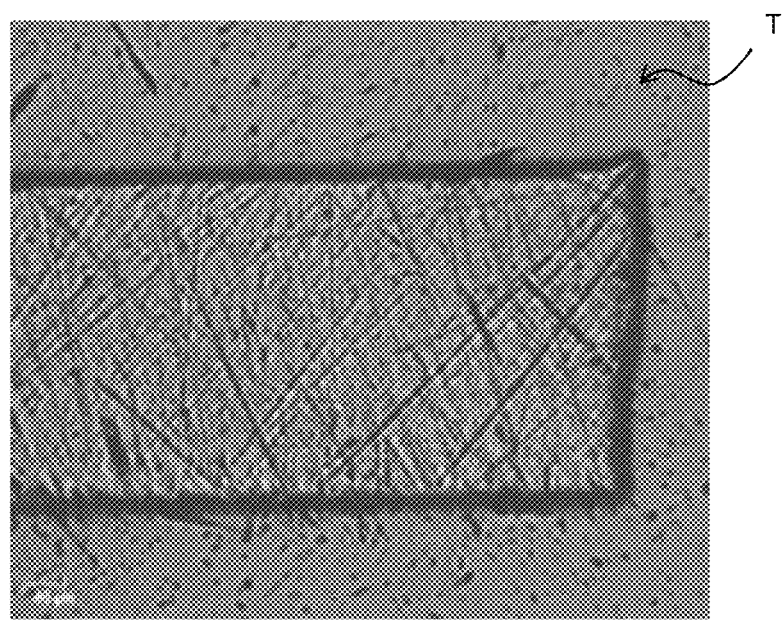
FIG. 13 is a view similar to that of FIG. 12 of a prior art reinforcing element.

In FIG. 12, a deformation of the ridges on the longitudinal edge of the reinforcing element according to the invention can be seen with respect to the prior art reinforcing element. This deformation makes it possible to obtain a reinforcing element that does not have any ridges, which by their nature protrude and could make it easier to create rupture initiators at the interface between the elastomer matrix and the reinforcing element.

The microhardness of each reinforcing element was first of all measured as described below.

Each average microhardness value is equal to the arithmetic average of 10 measurements carried out in each case on a cut substantially perpendicular to the main direction at the central point (measurement of Uc) and at the measuring point (measurement of Ur and U1) of each cut. The ten cuts are carried out along a length of 10 cm of the reinforcing element, for example at each centimetre.

The microhardness of the polymeric composition is measured by measuring the microhardness by nanoindentation. In this instance, a nanoindenter (model "Ultra NanoIndentation Tester UNHT" from CSM Instruments) is used. The polymeric composition is statically compressed in a small deformation range, in this case less than 10%. Each measurement is based on the measurement of the depth of penetration of a pyramidal indenter (Berkovich-type indenter) at a given load and at a given point. Each measurement is carried out in the form of a substantially linear load/unload cycle. The mechanical model used for processing the load/unload cycles is the Oliver and Pharr model, which is commonly used for linear elastomeric materials.

This model complies with the standard ISO14577-4:2007 reproduced here. The preparation of each test specimen comprises the coating of each reinforcing element in an epoxy resin. Next, the reinforcing element thus coated is cut in a cutting plane substantially perpendicular to the main direction Z1 and the test specimen is polished using papers with different grains (600, 1200) and then felts using different diamond-containing solutions (9 µm, 3 µm, 1 µm and 0.25 µm). The microhardness measurement is then carried out by moving the indenter perpendicularly to the cutting plane, in this case in the main direction Z1.

The values of the ratios $R=(Uc-U1)/Uc$ and $R=(Uc-Ur)/Uc$ were also compared, indicating the relative variation in the microhardness of the polymeric composition between the centre of the reinforcing element and its lateral edge.

The results of these measurements are given in Table 1 below.

TABLE 1

| Reinforcing element | Plasma treatment | Uc (GPa) | Ur (GPa) | U1 (GPa) | R |
|---|---|---|---|---|---|
| PET film T | No | 4.23 | 3.82 | / | 10% |
| PET film 34 | Yes | 4.13 | / | 2.81 | 32% |
| PET film 34' | Yes | 4.19 | / | 2.89 | 31% |

The reinforcing element T is such that R 11% and in this case R=10%. Specifically, by edge effect, the closer one gets to the external surface, the more the microhardness of the reinforcing element T decreases. However, since the relative decrease in the microhardness $R=(Uc-Ur)/Uc$ is limited to 10%, it does not make it possible to sufficiently limit the variation in microhardness between the elastomer matrix and the reinforcing element, unlike the invention. Specifically, the reinforcing elements 34, 34' are such that R>11%. R is even 15%, preferably R≥20% and more preferably R≥25%. R is also ≤40% for these reinforcing elements 34, 34'.

Figure 11:
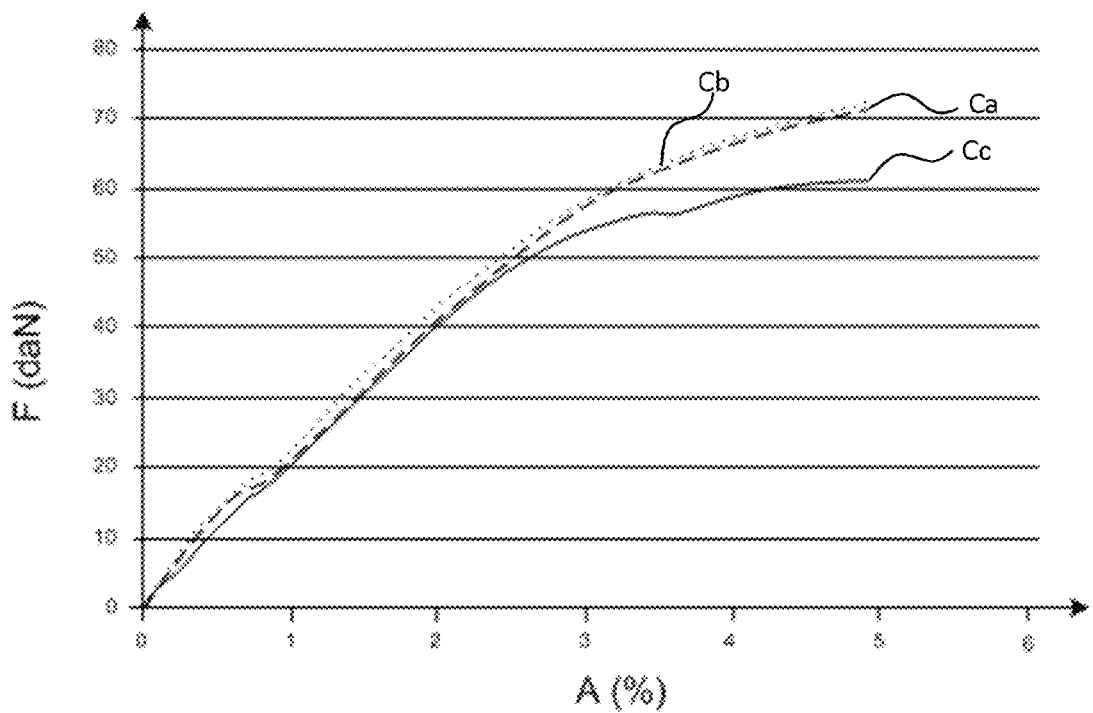
FIG. 11 is a graph including several force-elongation curves of several composite elements of which two are according to the invention.

In a second test, a force-elongation curve, well known to a person skilled in the art, of the composite elements 16, 16' according to the invention and K according to the prior art is realized. Each composite element 16, 16' respectively comprises reinforcing elements 34, 34' as described above. The test curves are shown in FIG. 11 and represent the variation in the force F as a function of elongation A. The force-elongation curve of the composite element 16 is represented by dashed lines (curve Ca). The force-elongation curve of the composite element 16' is represented by dotted lines (curve Cb). The force-elongation curve of the composite element K is represented by a continuous line (curve Cc). The rupture force values of the composite elements tested are summarized in Table 2 below.

TABLE 2

| Composite element | Reinforcing element | Plasma treatment | R | Fm (%) |
|---|---|---|---|---|
| K | PET film T | No | 10% | 100 |
| 16 | PET film 34 | Yes | 32% | 117 |
| 16' | PET film 34' | Yes | 31% | 118 |

In a third test, tyres 10, 10' according to the invention that respectively comprise composite elements 16, 16' according to the invention were compared with prior art tyres P1, P2. The size of the tyres tested is 175/65 R14.

The tyre P1 comprises a conventional architecture comprising a conventional working reinforcement comprising two crown plies comprising filamentary reinforcing elements consisting of metal cords of structure 2.30 arranged at a pitch of 1.2 mm and a hoop reinforcement comprising a hooping ply comprising filamentary reinforcing elements consisting of plied yarns made of polyamide 66 (140 tex/2, 250 t·m$^{-1}$/250 t·m$^{1}$).

The tyre P2 has an architecture identical to the tyres 10, 10' but does not comprise a composite element in which the reinforcing elements have been treated by way of the treatment process described above and therefore does not have a reinforcing element such that R>11%.

During this third test, the tyres 10, 10', P1 and P2 were subjected to a drift thrust Dz test as described below. The results are given in base 100 with respect to the tyre P1. Thus, the more the value is greater than 100, the better the drift thrust Dz of the tyre compared with the tyre P1 of the prior art.

To measure the drift thrust Dz, each tyre was driven at a constant speed of 80 km/h on a suitable automatic machine (machine of the "flat-track" type marketed by MTS), varying the load denoted "Z", at a relatively large cornering angle of 8 degrees, and the drift thrust was measured continuously and the cornering stiffness denoted "D" (corrected for the thrust at zero drift) was identified by recording, by way of sensors, the transverse load on the wheel as a function of this load Z; the cornering stiffness is thus obtained. For a chosen load, in this case 450 daN, the value given in Table 3 below is then obtained.

TABLE 3

| Tyre | Working ply/plies | Plasma treatment | R | Dz |
|---|---|---|---|---|
| P1 | Conventional | No | / | 100 |
| P2 | K | No | 10% | 94 |
| 10 | 16 | Yes | 32% | 100 |
| 10' | 16' | Yes | 31% | 102 |

Thus, the tyres 10 and 10' have all the advantages of the tyre P1 without the cornering stiffness at large angles being impaired, as is the case for the tyre P2.

The invention is not limited to the embodiments described above.

Specifically, a tyre according to the invention in which the crown reinforcement also comprises a protective reinforcement interposed radially between the hoop reinforcement and the working reinforcement may also be envisaged.

A tyre according to the invention in which the crown reinforcement does not comprise a hoop reinforcement but a protective reinforcement and a working reinforcement, the protective reinforcement being interposed radially between the tread and the working reinforcement, may also be envisaged.

Reinforcing elements other than a film may also be envisaged.

Provision could likewise be made to use the reinforcing element according to the invention in the carcass reinforcement.

A reinforcing element in which the central point is not made of the polymeric composition may be envisaged. In this case, the measurement Uc is carried out at the point of the polymeric composition that is radially closest to the central point.

It may also be possible to combine the features of the various embodiments described or envisaged above, as long as these are compatible with one another.

The invention claimed is:

1. A method for manufacturing a tire comprising the steps of:
   treating a reinforcing element, the reinforcing element comprising at least one lateral edge made of a polymeric composition comprising a thermoplastic polymer and the reinforcing element having a cross-section with a flattened overall shape and extending in a direction parallel to a direction in which the lateral edge extends,
   wherein the treating step comprises heating at atmospheric pressure at least a part of the lateral edge, during which at least a part of the lateral edge is subjected to a plasma flow generated by means of a plasma torch so as to raise the temperature of the part of the lateral edge above the melting point of the thermoplastic polymer and thereby eliminate ridges which are present on the lateral edge prior to application of the plasma flow; and
   embedding the reinforcing element in an elastomer matrix.

2. The method according to claim 1, wherein the plasma is of the cold plasma type.

3. The method according to claim 1, wherein the plasma flow is generated from a gas comprising at least one oxidizing component.

4. The method according to claim 3, wherein the oxidizing component is selected from the group consisting of carbon dioxide, carbon monoxide, hydrogen sulphide, carbon sulphide, dioxygen, nitrogen, chlorine, ammonia and mixtures thereof.

5. The method according to claim 4, wherein the oxidizing component is selected from the group consisting of dioxygen, nitrogen and mixtures thereof.

6. The method according to claim 5, wherein the oxidizing component is air.

7. The method according to claim 1, wherein the reinforcing element is made to move with respect to a source of plasma flow.

8. The method according to claim 1, wherein, subsequent to the step of heating the part of the lateral edge, the reinforcing element is coated with an adhesive.

9. The method according to claim 1, wherein the thermoplastic polymer is semi-crystalline.

10. The method according to claim 1, wherein the thermoplastic polymer is selected from the group consisting of a polyester, a polyamide, a polyketone and mixtures thereof.

11. The method according to claim 10, wherein the thermoplastic polymer is a polyester.

12. The method according to claim 1, wherein the reinforcing element has a thickness ranging from 0.05 to 1 mm.

13. The method according to claim 12, wherein the reinforcing element has a thickness ranging from 0.10 to 0.70 mm.

14. The method according to claim 1, wherein the reinforcing element has a width greater than or equal to 2.5 mm.

15. The method according to claim 14, wherein the reinforcing element has a width greater than or equal to 5 mm.

16. The method according to claim 15, wherein the reinforcing element has a width greater than or equal to 10 mm.

17. The method according to claim 1, wherein the cross-section with a flattened overall shape has an aspect ratio greater than or equal to 5.

18. The method according to claim 17, wherein the cross-section with a flattened overall shape has an aspect ratio greater than or equal to 10.

19. The method according to claim 18, wherein the cross-section with a flattened overall shape has an aspect ratio greater than or equal to 20.

20. The method according to claim 19, wherein the cross-section with a flattened overall shape has an aspect ratio greater than or equal to 30.

21. The method according to claim 1, wherein the reinforcing element is made of a film of the polymeric composition.

22. The method according to claim 21, wherein the film is multiaxially drawn.

* * * * *